(12) United States Patent
Ramesh

(10) Patent No.: US 6,957,222 B1
(45) Date of Patent: Oct. 18, 2005

(54) OPTIMIZING AN OUTER JOIN OPERATION USING A BITMAP INDEX STRUCTURE

(75) Inventor: Bhashyam Ramesh, San Diego, CA (US)

(73) Assignee: NCR Corporation, Dayton, OH (US)

(*) Notice: Subject to any disclaimer, the term of this patent is extended or adjusted under 35 U.S.C. 154(b) by 649 days.

(21) Appl. No.: 10/038,849

(22) Filed: Dec. 31, 2001

(51) Int. Cl.$^7$ ............................................. G06F 17/00
(52) U.S. Cl. ............................ 707/101; 707/2; 707/3; 707/4; 707/100
(58) Field of Search .................. 707/1–3, 10, 100, 707/101–102

(56) References Cited

U.S. PATENT DOCUMENTS

| | | | | |
|---|---|---|---|---|
| 5,426,760 A | * | 6/1995 | Moreland | 711/170 |
| 5,706,495 A | * | 1/1998 | Chadha et al. | 707/2 |
| 5,781,896 A | * | 7/1998 | Dalal | 707/2 |
| 5,787,435 A | * | 7/1998 | Burrows | 707/102 |
| 5,802,521 A | * | 9/1998 | Ziauddin et al. | 707/101 |
| 5,873,074 A | | 2/1999 | Kashyap et al. | 707/2 |
| 5,905,985 A | * | 5/1999 | Malloy et al. | 707/100 |

(Continued)

OTHER PUBLICATIONS

Bontempo et al.. Accelerating Indexed Searching, copywright 1997 Miller Freeman Inc., www.dbpd.com/vault/bontempo.htm.*
Shum, Parallel Implementations of Exclusion Joins, Proceedings of the Fifth Ieee Symp. on Paralllel and Distributed Processings, 1–4 Dec. 1993, pp. 742–747.
Toyama et al., Hash–Based Symmetric Data Structure and Join Algorithm for OLAP Applications, IEEE Internaional Symposium Proceedings on Database Engineering and Applications, 2–4 Aug. 1999, pp. 231–238.
Johnson, Relational Database Structure: Links, Joins and Normalization, <http://acl.arts.usyd.edu.au/VISTA/14–relational_databases/detailed_example.htm> pp. 1–5, Sep. 29, 1999.

*Primary Examiner*—Lihe S Wassum
*Assistant Examiner*—Susan Rayyan
(74) *Attorney, Agent, or Firm*—Baker Botts LLP

(57) ABSTRACT

A method, computer program and database system are disclosed for performing an outer join of at least a first table T1 and a second table T2. The join has join conditions. Each of the tables has an associated Star Map, S1 and S2, respectively. Each Star Map includes bitmap entries which have locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The method, computer program and database system include a) performing one or more Boolean operations using the bitmap entries of the Star Maps S1 and S2 to produce set bitmap entries in a Star Map SJ where there is a corresponding set bitmap entry in S1 and a corresponding set bitmap entry in S2, b) selecting a row from table T1 and hashing the combined entries in the one or more join key columns of the selected T1 row to identify a bitmap entry in SJ, and c) if the identified bitmap entry in SJ is not set, projecting the selected T1 row with a NULL corresponding to data from table T2. If d) the identified bitmap entry in SJ is set, performing the following: d1) if no row in T2 satisfies the join conditions and has entries in its one or more join key columns that together hash to the location of the identified set bitmap entry in SJ, projecting the selected T1 row and a NULL corresponding to data from table T2, d2) otherwise, for each row from T2 that satisfies the join condition and has entries in its one or more join key columns that together hash to the location of the identified set bitmap entry in SJ, projecting the selected T1 row with data from the row from T2, and e) repeating b)–d) for all rows in T1.

21 Claims, 6 Drawing Sheets

U.S. PATENT DOCUMENTS

| | | | | |
|---|---|---|---|---|
| 5,937,408 A | * | 8/1999 | Shoup et al. | 707/102 |
| 5,953,723 A | * | 9/1999 | Linoff et al. | 707/102 |
| 5,960,428 A | * | 9/1999 | Lindsay et al. | 707/4 |
| 5,960,434 A | * | 9/1999 | Schimmel | 707/100 |
| 5,963,933 A | * | 10/1999 | Cheng et al. | 707/2 |
| 5,963,954 A | * | 10/1999 | Burrows | 707/102 |
| 6,049,804 A | * | 4/2000 | Burgess et al. | 707/100 |
| 6,088,691 A | * | 7/2000 | Bhargava et al. | 707/2 |
| 6,105,020 A | * | 8/2000 | Lindsay et al. | 707/2 |
| 6,397,204 B1 | | 5/2002 | Liu et al. | 707/2 |
| 6,446,063 B1 | * | 9/2002 | Chen et al. | 707/4 |
| 6,484,159 B1 | | 11/2002 | Mumick et al. | 707/2 |
| 6,606,638 B1 | * | 8/2003 | Tarin | 707/200 |
| 6,618,729 B1 | * | 9/2003 | Bhashyam et al. | 707/101 |
| 6,684,203 B1 | | 1/2004 | Waddington et al. | 707/3 |

* cited by examiner

OPTIMIZING AN OUTER JOIN OPERATION USING A BITMAP INDEX STRUCTURE

BACKGROUND

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO). In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

An outer join query combines rows from tables identified in the FROM clause. The result of such a query contains all rows from a first table and data from matching rows in a second table, with nulls filled in where there are no matching rows in the second table. In queries including a left table and a right table, the first table is the left table in a LEFT OUTER JOIN and the right table in a RIGHT OUTER JOIN.

SUMMARY

In general, the invention features a method for performing an outer join of at least a first table T1 and a second table T2. The join has join conditions. Each of the tables has an associated Star Map, S1 and S2, respectively. Each Star Map includes bitmap entries which have locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The method includes a) performing one or more Boolean operations using the bitmap entries of the Star Maps S1 and S2 to produce set bitmap entries in a Star Map SJ where there is a corresponding set bitmap entry in S1 and a corresponding set bitmap entry in S2, b) selecting a row from table T1 and hashing the combined entries in the one or more join key columns of the selected T1 row to identify a bitmap entry in SJ, and c) if the identified bitmap entry in SJ is not set, projecting the selected T1 row with a NULL corresponding to data from table T2. d) If the identified bitmap entry in SJ is set, the method includes performing the following: d1) if no row in T2 satisfies the join conditions and has entries in its one or more join key columns that together hash to the location of the identified set bitmap entry in S3, projecting the selected T1 row and a NULL corresponding to data from table T2; and d2) otherwise, for each row from T2 that satisfies the join condition and has entries in its one or more join key columns that together hash to the location of the identified set bitmap entry in SJ, projecting the selected T1 row with data from the row from T2, and e) repeating b)–d) for all rows in T1.

Implementations of the invention may include one or more of the following. A plurality of tables T2' and a plurality of associated Star Maps S2' may be provided, Star Map S1 may be logically ANDed with each Star Map S2' to generate join Star Maps SJ', respectively, and (b) through (e) may be executed for all tables T2' and associated Star Maps S2'. The method may further include determining the expected cardinality of the join result, and if the cardinality is less than a predefined threshold value, performing a) through e). The threshold value may be determined dynamically depending on at least one parameter. T1 may be the right table in a right outer join operation. T1 may be the left table in a left outer join operation. The one or more Boolean operations may be a logical AND operation.

In general, in another aspect, the invention features a computer program, stored on a tangible storage medium, for performing an outer join of at least a first table T1 and a second table T2. The join has join conditions. Each of the tables has an associated Star Map, S1 and S2, respectively. Each Star Map includes bitmap entries having locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The program includes executable instructions that cause a computer to a) perform one or more Boolean operations using the bitmap entries of the Star Maps S1 and S2 to produce set bitmap entries in a Star Map SJ where there is a corresponding set bitmap entry in S1 and a corresponding set bitmap entry in S2, b) select a row from table T1 and hash the combined entries in the one or more join key columns of the selected T1 row to identify a bitmap entry in SJ, and c) if the identified bitmap entry in SJ is not set, project the selected T1 row with a NULL corresponding to data from table T2. The program includes executable instructions that, d) if the identified bitmap entry in SJ is set, cause a computer to d1) if no row in T2 satisfies the join conditions and has entries in its one or more join key columns that together hash to the location of the identified set bitmap entry in SJ, project the selected T1 row and a NULL corresponding to data from table T2, and d2) otherwise, for each row from T2 that satisfies the join conditions and has entries in its one or more join key columns that together hash to the location of the identified set bitmap entry in SJ, project the selected T1 row with data from the row from T2, and e) repeat b)–d) for all rows in T1.

In general, in another aspect, the invention features a database system for accessing a database according to a outer join query. The query includes join conditions. The database system includes a massively parallel processing system including one or more nodes, a plurality of CPUs, each of the one or more nodes providing access to one or more CPUs, a plurality of virtual processes, each of the one or more CPUs providing access to one or more processes, each process configured to manage data stored in one of a plurality of data-storage facilities, and at least a first table T1 and a second table T2 being distributed among the data-storage facilities. Each of the tables has an associated Star Map, S1 and S2, respectively. Each Star Map is distributed among the data-storage facilities. Each Star Map includes bitmap entries which have locations indexed by the hash of one or more values associated with one or more join key columns of its associated table. A bitmap entry in a Star Map, if set, indicates the presence of a row in its associated table that has entries in the one or more join key columns that together hash to the location of the bitmap entry. The database system includes a join process executed on one or more of the plurality of CPUs that cause the CPUs to a) perform one or more Boolean operations using the bitmap entries of the Star Maps S1 and S2 to produce set bitmap entries in a Star Map SJ where there is a corresponding set bitmap entry in S1 and a corresponding set bitmap entry in S2, b) select a row from table T1 and hash the combined entries in the one or more join key columns of the selected T1 row to identify a bitmap entry in SJ, and c) if the identified bitmap entry in SJ is not set, project the selected T1 row with a NULL corresponding to data from table T2. d) If the identified bitmap entry in SJ is set, performing the following: d1) if no row in T2 satisfies the join conditions and has entries in its one or more join key columns that together hash to the location of the identified set bitmap entry in SJ, project the selected T1 row and a NULL corresponding to data from table T2, and d2) otherwise, for each row from T2 that satisfies the join condition and has entries in its one or more join key columns that together hash to the location of the identified set bitmap entry in SJ, project the selected T1 row with data from the row from T2, and e) repeat b)–d) for all rows in T1.

Other features and advantages will become apparent from the description and claims that follow.

DETAILED DESCRIPTION

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Overview

The present invention comprises a bitmap index structure, known as a Star Map, that improves the performance of large table joins that have low join cardinality, where cardinality is related to the number of rows in the join result. The database system uses hash-based addressing in the Star Map, so that the size of the Star Map is constant and therefore access times are constant. Moreover, access times are independent of the number of rows in the tables being joined, up to a preset limit, which can be altered by a systems administrator. As a result, the Star Map improves the performance of outer joins where two or more large tables are joined and the cardinality of the join is small (i.e., the join result has a small number of rows).

Environment

Figure 1:
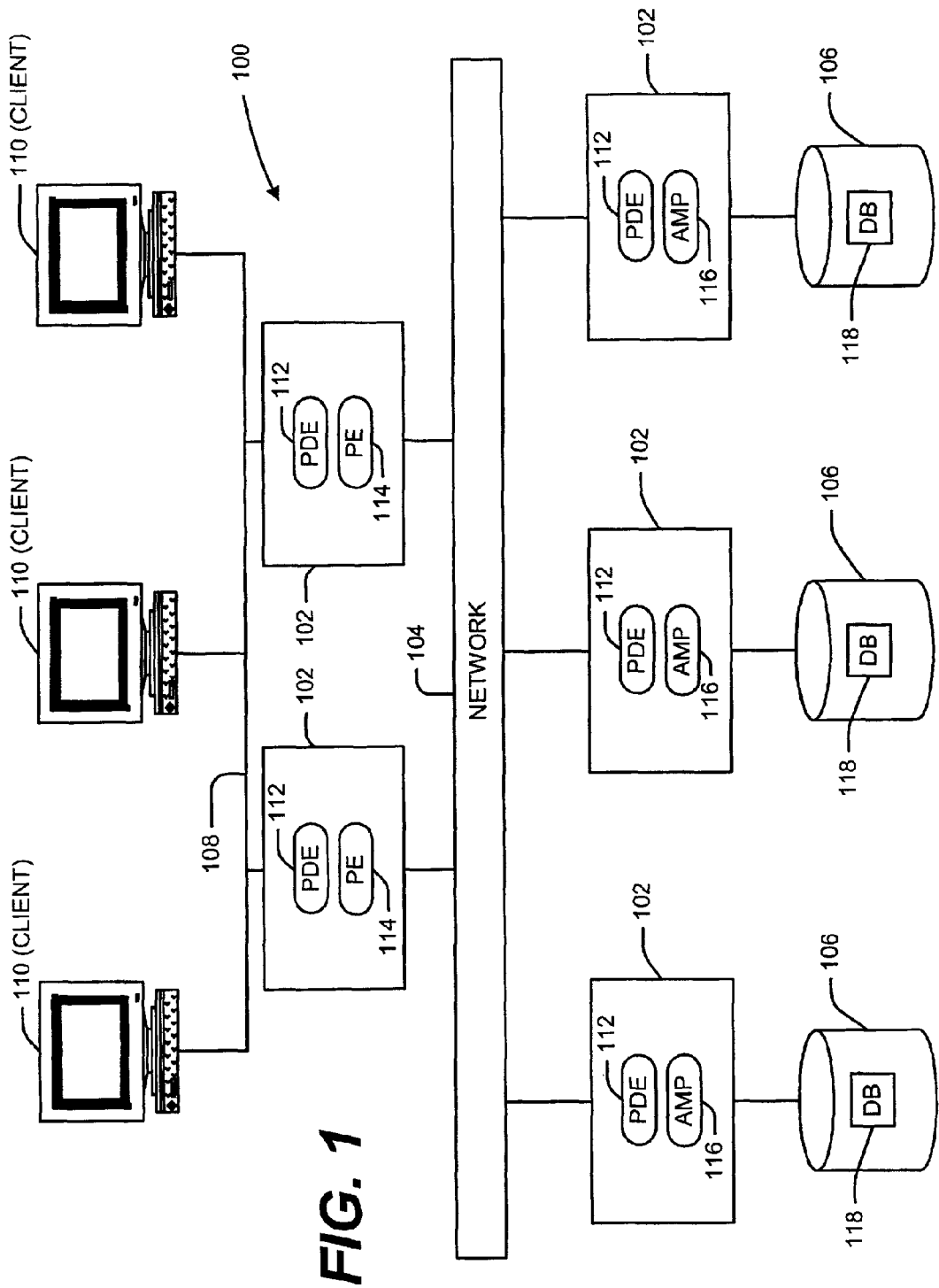
FIG. 1 illustrates an exemplary hardware and software environment that could be used with the preferred embodiment of the present invention.

FIG. 1 illustrates an exemplary hardware and software environment that could be used to implement the database system described below. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by a Relational DataBase Management System (RDBMS) executed by the system 100.

In one example, the RDBMS comprises the Teradata® product offered by NCR Corporation, the assignee of the present invention, and includes one or more Parallel Database Extensions (PDEs) 112, Parsing Engines (PEs) 114, and Access Module Processors (AMPs) 116. These components of the RDBMS perform the functions necessary to implement the RDBMS and SQL functions, i.e., definition, compilation, interpretation, optimization, database access control database retrieval, and database update.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements described below to be performed.

Those skilled in the art will recognize that the exemplary environment illustrated in 1 FIG. 1 is not intended to limit the present invention. Indeed, those skilled in the art will recognize that other alternative environments may be used without departing from the scope of the present invention. In addition, it should be understood that the present invention may also apply to components other than those disclosed herein.

In an example system, work is divided among the PUs 102 in the system 100 by 1 spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMPs 116 managing the DSUs 106 that store the subset of rows.

The PDEs 112 provide a high speed, low latency, message-passing layer for use in communicating between the PEs 114 and AMPs 116. Further, the PDE 112 is an application programming interface (API) that allows the RDBMS to operate under either the UNIX MP-RAS or WINDOWS NT operating systems, in that the PDE 112 isolates most of the operating system dependent functions from the RDBMS, and performs many operations such as shared memory management, message passing, and process or thread creation.

The PEs 114 handle communications, session control, optimization and query plan generation and control, while the AMPs 116 handle actual database 118 table manipulation. The PEs 114 fully parallelize all functions among the AMPs 116. Both the PEs 114 and AMPs 116 are known as "virtual processors" or "vprocs".

The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In one example, data partitioning and repartitioning may be performed, in order to enhance parallel processing across multiple AMPs 116. For example, the database 118 may be hash partitioned, range partitioned, or not partitioned at all (i.e., locally processed).

Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Execution of SQL Queries

Figure 2:
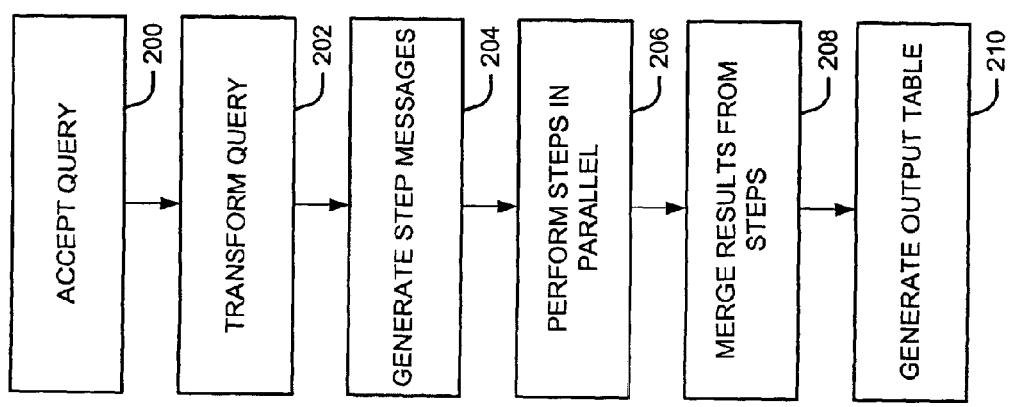
FIG. 2 is a flow chart illustrating the steps necessary for the interpretation and execution of user queries or other SQL statements according to the preferred embodiment of the present invention.

FIG. 2 is a flow chart illustrating the steps necessary for the interpretation and execution of user queries or other SQL statements according to the preferred embodiment of the present invention.

Block 200 represents SQL statements being accepted by the PE 114.

Block 202 represents the SQL statements being transformed by a Compiler or Interpreter subsystem of the PE 114 into an execution plan. Moreover, an Optimizer subsystem of the PE 114 may transform or optimize the execution plan in a manner described in more detail later in this specification.

Block 204 represents the PE 114 generating one or more "step messages" from the execution plan, wherein each step message is assigned to an AMP 116 that manages the desired records. As mentioned above, the rows of the tables in the database 118 may be partitioned or otherwise distributed among multiple AMPs 116, so that multiple AMPs 116 can work at the same time on the data of a given table. If a request is for data in a single row, the PE 114 transmits the steps to the AIMP 116 in which the data resides. If the request is for multiple rows, then the steps are forwarded to all participating AMPs 116. Since the tables in the database 118 may be partitioned or distributed across the DSUs 106 of the AMPs 116, the workload of performing the SQL query can be balanced among AMPs 116 and DSUs 106.

Block 204 also represents the PE 114 sending the step messages to their assigned AMPs 116.

Block 206 represents the AMPs 116 performing the required data manipulation associated with the step messages received from the PE 114, and then transmitting appropriate responses back to the PE 114.

Block 208 represents the PE 114 merging the responses that come from the AMPs 116.

Block 210 represents the output or result table being generated.

Left/Right Outer Join Operation

Figure 3:
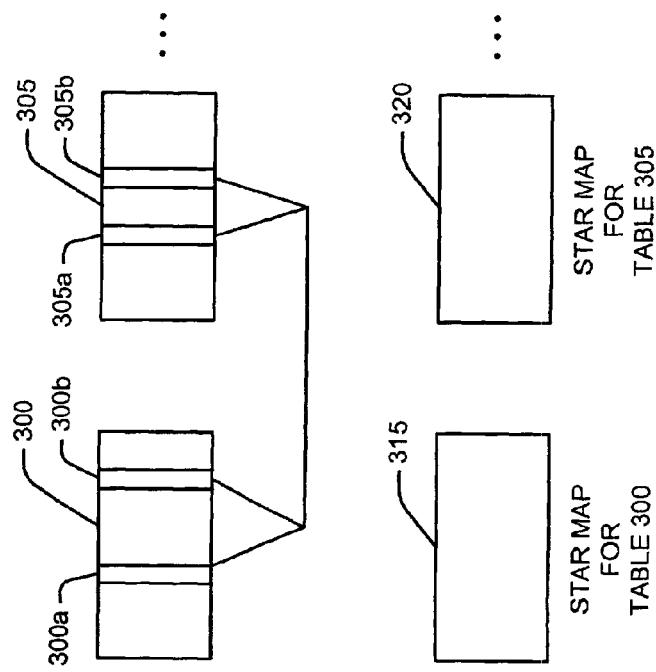
FIG. 3 is a representation of a two-table join and Star Maps associated with the two tables.

FIG. 3 is a query graph that represents an outer join operation, wherein the boxes 300 and 305 represent tables, and the lines between join key columns 300a, 300b, 305a, and 305b of the tables 300, and 305, respectively, represent the join to be executed. It will be apparent to persons of ordinary skill that the principles described herein will apply to any outer join involving two or more tables and to any join in which there are one or more join key columns as will be explained in more detail below.

An exemplary SQL query for performing a left outer join operation using the tables shown in FIG. 3 would be the following:

```
SELECT <list of columns>
    FROM 300 LEFT OUTER JOIN
    ON
        300.300a = 305.305a AND
        300.300b = 305.305b AND
        <other selection criteria>
```

In this example, the tables 300, and 305 are joined according to equivalence relations indicated in the query. It is the job of the Optimizer subsystem of the PE 114, at step 202 of FIG. 2, to select a least costly binary join order. The result table will include all of the rows from the left table 300, with data concatenated, or combined in some other way, from matching rows from T2, or with NULLs where T2 does not include any matching rows.

In a join such as that illustrated in FIG. 3, there may be numerous unnecessary accesses to the left or right tables 300, 305 when performing a right or left outer join operation, respectively. Consider one example using FIG. 3. Assume that in a left outer join operation the right table 305 has approximately 1 billion rows and the join operation produces only 100,000 result rows in which data is derived from the right table, with the remaining rows having nulls where data from the right table would have been had it existed. In this example, a large percentage of the accesses to the right table 305 are unnecessary. A similar analysis would apply to right outer join operations.

Star Maps 315, 320 associated with each table 300, 305, respectively, can be used to minimize unnecessary accesses to the table 300 or 305, depending on whether a left or right outer join operation is being performed. The Star Maps 315, 320 are bitmap index structures used to filter accesses to the tables 300 or 305, i.e., to determine whether an access to the respective table 300 or 305 would be productive.

Star Map Structure

Figure 4:
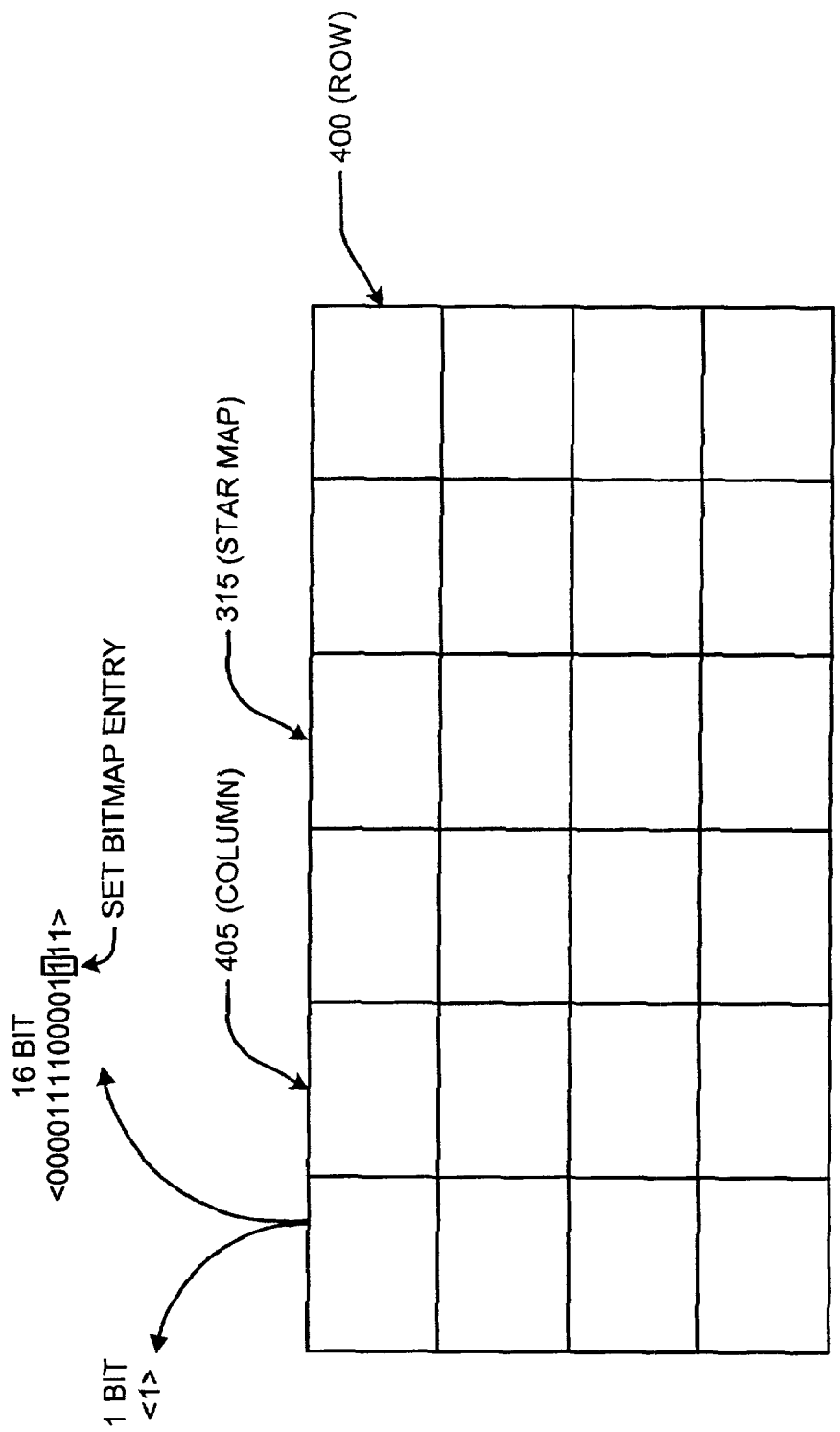
FIG. 4 is a block diagram that illustrates the structure of a Star Map according to the preferred embodiment of the present invention.

An example structure for a Star Map will now be discussed in relation to Star Map 315. It will be understood that this discussion will be equally applicable to the other Star Map 320 illustrated in FIG. 3. The example Star Map 315, which is associated with table 300, includes a plurality of rows 400, wherein each row includes a plurality of columns 405, as shown in FIG. 4. In one example, the Star Map 315 includes 64K rows 400, each of the rows 400 includes 64K columns 405, and each of the columns 405 comprises either a 1-bit or a 16-bit value. In one example, a bit in the 1-bit value having a value "1", rather than "0", is referred to as a "set bitmap entry." When the number of rows 400 of the Star Map 315 is 64K and each row 400 has 64K columns 405, then the Star Map 315 can map approximately 23 or 4 billion rows in its associated table 300 when the column 405 comprises a 1-bit value or 236 or 64 billion rows in its associated table 300 when the column 405 comprises a 16-bit value.

The number of rows 400, the number of columns 405, the size of each column 405 value, and the hashing functions used are determined and fixed at creation time, depending on the cardinality of the table being represented. Of course, those skilled in the art will recognize that any number of rows 400, any number of columns 405, any size of column 405 value, and any number of different hashing functions could be used without departing from the scope of the present invention. Further, those skilled in the art will recognize that the Star Map 315 may take a form different from the form illustrated in FIG. 4, such as an ordered sequence of bits, bytes, or words, without departing from the scope of the present invention.

One or more join columns of the table 300 associated with the Star Map 315 are used to generate the column 405 values of the Star Map 315, wherein the join columns usually comprise a partition index, or a primary index. With some additional enhancements, a secondary index of the table can be used. Depending on the structure of the data base and its indexes any other suitable index can be used. The primary index of the table is used in the following examples. In the example shown in FIG. 3, the join key columns 300a, 300b, 305a, and 305b are used to generate the respective Star Maps 315 and 320, respectively.

In one example, the table's 300 join key columns 300a and 300b are concatenated, or combined in some other way, and then hashed to generate a 32-bit hash-row value. This 32-bit hash-row value is then used to address the Star Map 315. In one example, the upper 16 bits of the 32-bit hash-row value are used to select a row 400 of the Star Map 315 and the lower 16 bits of the 32-bit hash-row value are used to select a column 405 of the selected row 400 of the Star Map 315. The column 405 value indicates whether the corresponding row may exist in the table 300 associated with the Star Map 315. If the selected column 405 value is set, then the corresponding row might exist in the table 300; otherwise, the row would not exist in the table 300.

A bitmap entry in a Star Map conveys two types of information. First, if the bitmap entry is set, a row that hashes to that location exists in the corresponding table but because a hashing algorithm may produce the same hash result for many different inputs, a set bitmap entry does not definitively identify a row in the corresponding table. Just as importantly, if the bitmap entry is not set, the corresponding table does not have a row that hashes to that location. Thus, a Star Map not only gives clues about what a corresponding table contains, it also gives firm information concerning what it does not contain.

When the number of rows in the table 300 associated with the Star Map 315 is less than 4 billion, and when there is not significant skew in the join column values of its associated table, then each column 405 of the Star Map 315 may only comprise a 1-bit value to indicate whether the corresponding record exists in the table 300. However, when the number of rows in the table exceeds 4 billion, or when there is significant skew in the join columns of the table 300 associated with the Star Map, then additional bits may be added to each column 405 of the Star Map 315, so that a single column 405 can be used for multiple hash-row values of its associated table 300, in order to deal with hash collisions.

In one example, each column 405 within a row 400 of the Star Map 315 selected by the hash-row value of the table 300 associated with the Star Map 315 may comprise 16 bits. In that case, each hash-row value of the table 300 would select both a row 400 and a column 405 of the Star Map 315, and then another hash function would be performed on the join columns of the table 300 to select one of the bits within the selected column 405. If the selected bit is set, then the corresponding row might exist in the table 300; otherwise, the row would not exist in the table 300. Of course, there would still be the possibility of hash collisions, even with the larger columns 405 of the Star Map 315.

The Star Map 315 is updated whenever changes are made to its associated table 300. For example, when a row is inserted into the associated table 300, a corresponding column 405 value in a corresponding row 400 of the Star Map 315 is set. Similarly, when a row is deleted from the table 300, a corresponding column 405 value in a corresponding row 400 of the Star Map 315 is reset, taking hash collisions into account. When a row is updated in the associated table 300, a column 405 value in a row 400 of the Star Map 315 corresponding to the new hash-row value and new column values are set, while a column 405 value in a row 400 of the Star Map 315 corresponding to the old hash-row value and column values are reset, while taking hash collisions into account The number of bits stored in each of the 64K columns 405 of the Star Map 315 is called the "degree" of the Star Map 315 and determines the size of each row 400 in the Star Map 315. For example, a Star Map 315 of degree 1 has a row 400 length of 8 K bytes, while a Star Map 315 of degree 16 has a row 400 length of 128 K bytes. Generally, the degree of the Star Map 315 may be implemented as a parameter, so that the row size can be set to any desired value.

In the examples described above, the total size of the Star Map 315 is either 512 MB (a Star Map 315 of degree 1) or 8192 MB (a Star Map 315 of degree 16), respectively. The Star Map 315 may be partitioned across PUs 102 (for example, in a manner similar to the table) according to the upper 16 bits of the 32-bit hash-row value. Therefore, in a 20-node system 100, each PU 102 would store approximately 25 MB (a Star Map 315 of degree 1) or 410 MB (a Star Map 315 of degree 16) of a partitioned Star Map 315, respectively. Similarly, in a 96-node system, each PU 102 would manage approximately 5 MB (a Star Map 315 of degree 1) or 85 MB (a Star Map 315 of degree 16) of a partitioned Star Map 315, respectively. Partitions of these sizes may fit entirely within the main memory of the PUs 102.

Logic of the Join Algorithm

Star Maps can make the execution of joins involving a set of tables T1 through TN more efficient. Assume that each of the tables T1 through TN has an associated Star Map, S1 through SN, respectively. To perform a join, the system first performs one or more Boolean operation (such as a logical AND, OR, XOR, NAND, etc., or a combination of such operations) using the bitmap entries of two or more Star Maps to produce, depending on the complexity of the query, eventually one or more intermediate Star Maps SINT and/or in a final or single operation a final join Star Map S3.

The system then uses SJ to select rows from the tables T1 through TN. For example, the system may use set bitmap entries in SJ as keys to select rows from T1 through TN. In one example, the hash value of the row or rows to be selected can be derived by concatenating, or combining in some other way, the 16 bit Star Map row position and the 16 bit Star Map column position of a set bitmap entry to create a 32 bit hash value. Tables T1 through TN can then be searched for rows that hash to that hash value. Depending on the hash algorithm, the search can result in the retrieval of more than one row from a given table or tables. However, reconstruction of a hash value in any kind of Star Map environment can be performed very easily. Alternatively, the system may use unset bitmap entries in SJ as keys.

The system joins the resulting rows to produce a join result. Under certain circumstances, determined by the query, the Boolean operation being performed, and other factors including the size of S3 and the size of the tables T1 through TN, such a system will access fewer rows in T1 through TN to perform the join, thereby reducing the cost of the query.

Figure 5:
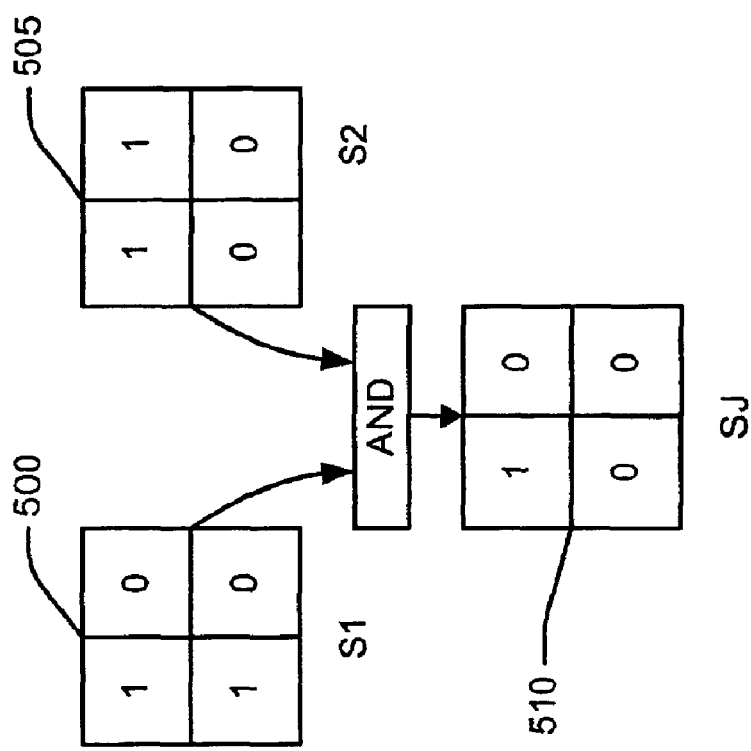
FIG. 5 is a flow chart of a method for performing a Boolean operation on two Star Maps to create a join Star Map useful in performing left/right outer join operations.

Use of Star Maps to perform an outer join between two tables, T1 and T2 having Star Maps S1 and S2, respectively, is illustrated in FIG. 5. Again, this function is used to join the rows from an outer table with data from matching rows from an inner table, and when the inner table does not contain any matching data, to project NULLs where the data from the inner table would have been projected had it existed. In a first example, as shown in FIG. 5, the Star Maps S1 and S2 are logically combined using a Boolean AND operator to create a join Star Map SJ.

This operation is shown in more detail in FIG. 5 by means of a simple example using two 2 by 2 Star Maps 500 and 505. The join Star Map SJ 510 is created by logically ANDing the first Star map 500 and the second Star Map 505. In this example, S1 and S2 are the same size and are created using the same hashing algorithm. In that case, ANDing the two Star Maps together requires applying a logical AND function to corresponding entries from the two Star Maps. An entry in the join Star Map SJ is set only if the corresponding entries in S1 and S2 are set. The join Star Map 510 shows only a single bit set in this example. This is because the corresponding row and column are the only ones set to "1" in both source Star Maps 500 and 505.

Figure 6:
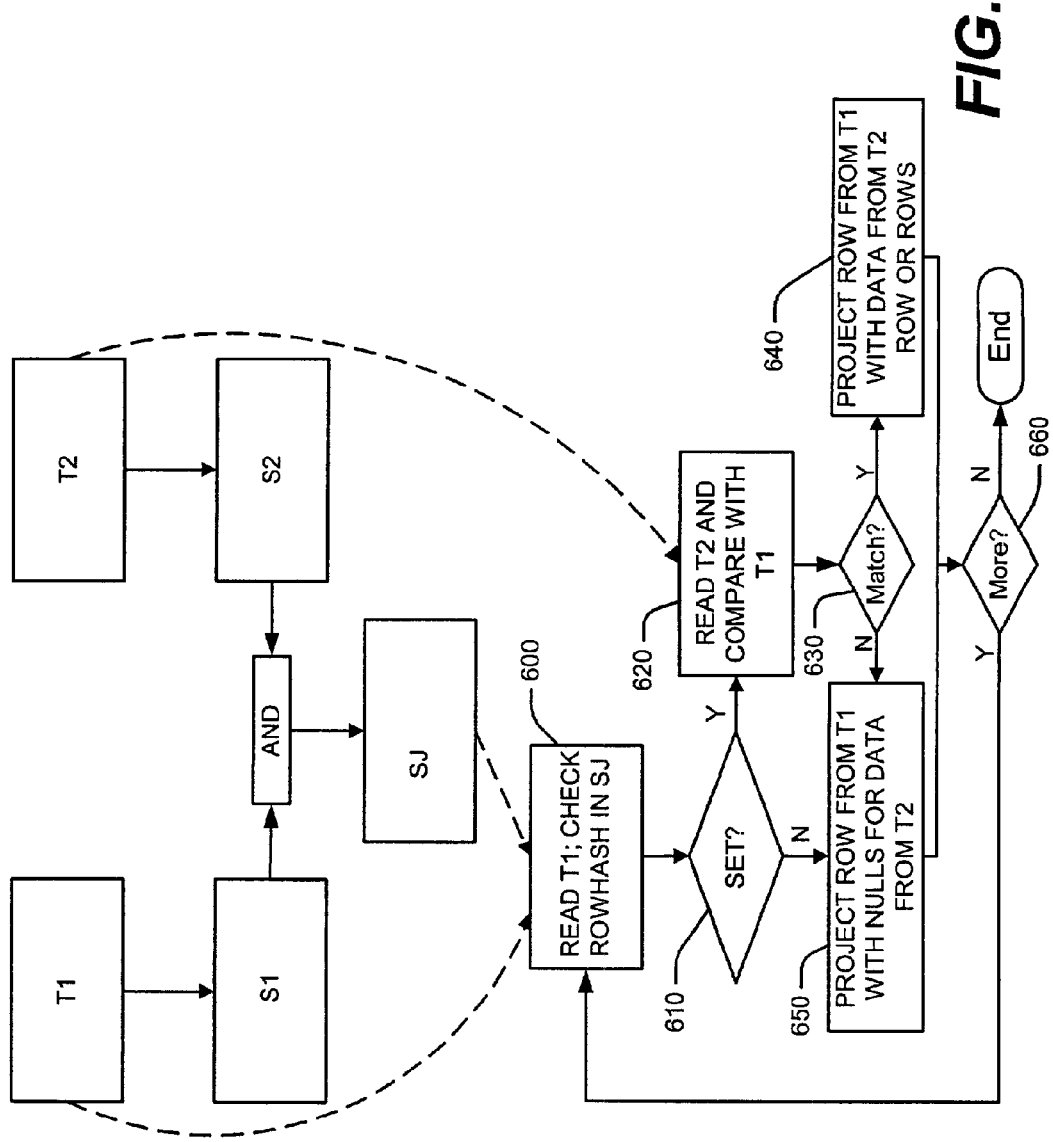
FIG. 6 is a flow chart of a method for performing a left/right outer join operation with two tables using Star Maps.

FIG. 6 shows in the upper part the structure and connection of the tables T1, T2 and their associated Star maps S1, S2, as well as the generated join Star Map SJ. The lower part of FIG. 6 shows a flow chart indicating how the tables and Star Map SJ are used and accessed to produce the result of a left outer join operation. As can be seen, the left (outer) table T1 and the right (inner) table T2 have associated Star Maps S1 and S2, respectively, which are generated and updated as discussed above. In the left outer join illustrated in FIG. 6, a join Star Map SJ is generated according to the principle shown in FIG. 5 using the Boolean AND operator. A first row is selected from Table T1 according to the SELECT portion of the query (block 600). The rowhash value for the selected T1 row is computed and used to access SJ (block 600).

If the corresponding bit in SJ is set (block 610), then it is known that T2 contains a row that maps to the same location, in that the hash of its join key column or columns identifies the same bitmap entry location in SJ. However, it is still not known whether the values of the join key column or columns of the T2 row or rows match the values of the join key column or columns of the selected T1 row, which is necessary to satisfy the join conditions. Therefore, if values of the join key column or columns of a T2 row or rows that map to the same SJ location as the selected T1 row also match the values of the join key column or columns of the selected T1 row (blocks 620 and 630), the selected T1 row is projected along with the data from the matching T2 row or rows (block 640). If more than one T2 rows match the selected T1 row, then additional versions of the selected T1 row will be projected, with each row containing data from a different matching T2 row. If no T2 rows match, then the selected T1 row is projected with NULLs where the data from T2 would have been had a matching row been found (block 650). If T1 has more rows (block 660), processing continues with another row from T1. Otherwise, processing ends.

If the corresponding bitmap entry in SJ is not set (block 610), then it is known that T2 does not contain a row that maps to the same location in SJ. Consequently, the selected row from T1 is projected with NULLs in the places where data from T2 would have been had a matching T2 row existed (block 650). An improvement in efficiency is caused by the fact that it is not necessary to access T2 when the corresponding bitmap entry in SJ is not set.

The previous discussion concerned a left outer join. A right outer join would be described by replacing each mention of "T2" in the discussion above with "T1" and replacing each mention of "T1" in the discussion above with "T2."

A person of ordinary skill will recognize that it is not necessary for S1 and S2 to be the same size, be created using the same hash function or have the same mapping of hash values. If any of those parameters or any other parameter or parameters of S1 and S2 are different, the system will make the necessary adjustments between the two Star Maps prior to performing the AND function or as the AND function is being performed assuming that S1 and S2 are sufficiently similar to allow such adjustments to be made. Persons of ordinary skill will also recognize that the AND function can be accomplished using other equivalent Boolean expressions, such as, for example, expressions equivalent to the AND function by virtue of DeMorgan's Law.

The left/right outer join algorithm can also be applied to a plurality of tables T1 ... TN. For example, a left outer join query might specify a single left table T1 and a plurality of right tables T2 ... TN. In such a case, a plurality of respective join Star Maps SJ2 ... SJN will be created, by logically ANDing T1 with one of the tables T2 ... TN, respectively. Star Maps SJ2 ... SJN contain set bitmap entries at locations where both T1 and T2 ... TN, respectively, have set bitmap entries.

Taking advantage of this characteristic, the system will only need to access T2 ... TN for those rows that hash to the location of the set bitmap entries in their respective join Star Map SJ2 ... SJN. The system will then project the resulting rows from T1 and T2 ... TN, respectively, to produce the requested result, projecting NULLs where T2 ... TN contain no matching rows. By joining only those rows that hash to locations of set bitmap entries in the join Star Maps SJ2 ... SJN, the system avoids accessing those rows in T2 ... TN that would not contribute to the join result, thereby saving time and cost in performing the join. If instead of a hash value, a value is used to set the bitmap, then there would not even be necessary to probe the base tables. However, this causes a limitation in the value range which, for example, could not exceed 4 billion for a degree 1 bitmap. To extend this range higher values, for example two 32 bit values or any other higher sized value could be used.

The use of Star Maps to perform join operations adds overhead to the join operation because the join Star Map must be generated and accessed. Above a threshold value of join result cardinality, the use of Star Maps, as described above, to perform outer joins will be less efficient than using traditional join methods. Thus, in one example system, the system will perform a traditional left/right outer join if the expected join result cardinality is greater than a predetermined threshold. The expected join result cardinality may be predicted by the optimizer prior to performing the join based on statistics and operation cost collected by the system.

The cardinality threshold might vary from one join to another. The cardinality threshold may be manually set by a system operator or it may depend on the performance of the computer system and may be determined dynamically and/or adaptively by the computer system based on measured performance and/or cardinality estimates.

Figure 7:
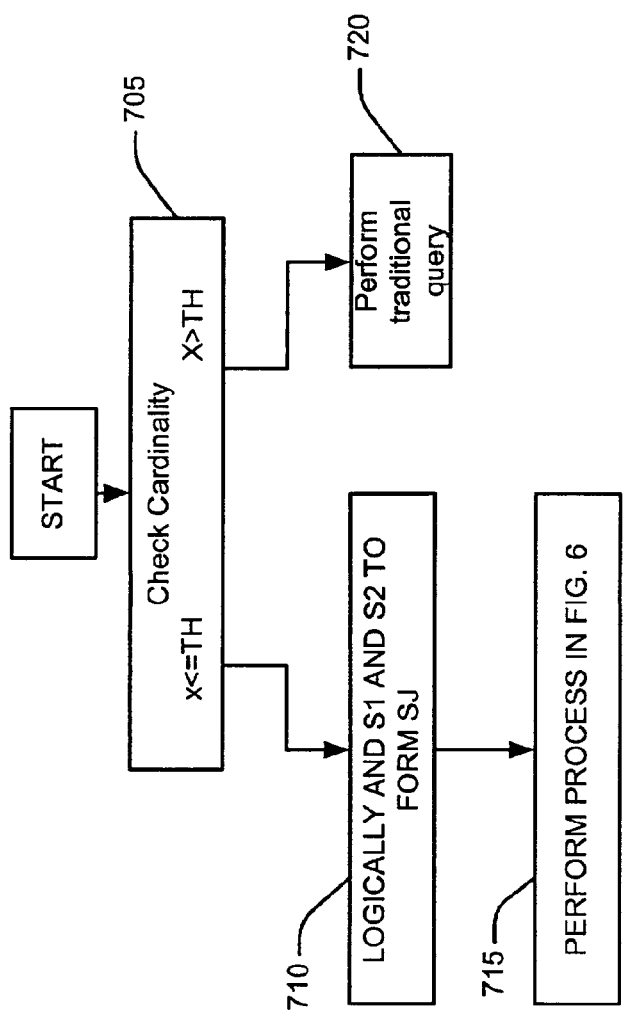
FIG. 7 is a flow chart of a method for performing left/right outer join operations.

In use, as shown in FIG. 7, the expected join cardinality of the join is compared to a cardinality threshold TH (block 705). If the expected cardinality is less than the threshold TH, the system logically ANDs Star Maps S1 and S2 to create the join Star Map SJ (block 710). The system then performs the processes shown in FIG. 6 (block 715). If, on the other hand, the expected join cardinality is greater than the cardinality threshold TH (block 705), the system performs traditional join techniques are used to execute the join (block 720).

CONCLUSION

This concludes the description of the preferred embodiment of the invention. The following describes some alternative embodiments for accomplishing the same invention. In one alternative embodiment, any type of computer, such as a mainframe, minicomputer, or personal computer, could be used to implement the present invention. In addition, any DBMS that performs outer joins could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for performing an outer join of at least a first table T1 and a second table T2, where the join has join conditions, each of the tables has an associated Star Map, S1 and S2, respectively, and each Star Map includes bitmap entries having locations indexed by the hash of one or more values associated with one or more join key columns of its associated table, where a bitmap entry in a Star Map, if set, indicates the presence of a row in its associated table that has entries in the one or more join key columns that together hash to the location of the bitmap entry, the method including:

a) performing one or more Boolean operations using the bitmap entries of the Star Maps S1 and S2 to produce set bitmap entries in a Star Map SJ where there is a corresponding set bitmap entry in S1 and a corresponding set bitmap entry in S2;

b) selecting a row from table T1 and hashing the combined entries in the one or more join key columns of the selected T1 row to identify a bitmap entry in SJ;

c) if the identified bitmap entry in SJ is not set, projecting the selected T1 row with a NULL corresponding to data from table T2; and d) if the identified bitmap entry in SJ is set, performing the following:

d1) if no row in T2 satisfies the join conditions and has entries in its one or more join key columns that together hash to the location of the identified set bitmap entry in SJ, projecting the selected T1 row and a NULL corresponding to data from table T2; and d2) otherwise, for each row from T2 that satisfies the join condition and has entries in its one or more join key columns that together hash to the location of the identified set bitmap entry in SJ, projecting the selected T1 row with data from the row from T2;

e) repeating b)–d) for all rows in T1.

2. The method of claim 1, wherein a plurality of tables T2' and a plurality of associated Star Maps S2' are provided, whereby Star Map S1 is logically ANDed with each Star Map S2' to generate join Star Maps SJ', respectively, and (b) through (e) are executed for all tables 12' and associated Star Maps S2'.

3. The method of claim 1 further comprising determining the expected cardinality of the join result, and if the cardinality is less than a predefined threshold value, performing a) through e).

4. The method of claim 3, wherein the threshold value is determined dynamically depending on at least one parameter.

5. The method of claim 1, wherein T1 is the right table in a right outer join operation.

6. The method of claim 1, wherein T1 is the left table in a left outer join operation.

7. The method of claim 1, wherein the one or more Boolean operations is a logical AND operation.

8. A computer program, stored on a tangible storage medium, for performing an outer join of at least a first table T1 and a second table T2, where the join has join conditions, each of the tables has an associated Star Map, S1 and S2, respectively, and each Star Map includes bitmap entries having locations indexed by the hash of one or more values associated with one or more join key columns of its associated table, where a bitmap entry in a Star Map, if set, indicates the presence of a row in its associated table that has entries in the one or more join key columns that together hash to the location of the bitmap entry, the program including executable instructions that cause a computer to:

a) perform one or more Boolean operations using the bitmap entries of the Star Maps S1 and S2 to produce set bitmap entries in a Star Map SJ where there is a corresponding set bitmap entry in S1 and a corresponding set bitmap entry in S2;

b) select a row from table T1 and hash the combined entries in the one or more join key columns of the selected T1 row to identify a bitmap entry in SJ;

c) if the identified bitmap entry in SJ is not set, project the selected T1 row with a NULL corresponding to data from table T2; and d) if the identified bitmap entry in SJ is set, performing the following:

d1) if no row in T2 satisfies the join conditions and has entries in its one or more join key columns that together hash to the location of the identified set bitmap entry in SJ, project the selected T1 row and a NULL corresponding to data from table T2; and d2) otherwise, for each row from T2 that satisfies the join conditions and has entries in its one or more join key columns that together hash to the location of the identified set bitmap entry in SJ, project the selected T1 row with data from the row from T2;

e) repeat b)–d) for all rows in T1.

9. The computer program of claim 8, wherein a plurality of tables T2' and a plurality of associated Star Maps S2' are provided, and the program includes executable instructions for causing the Star Map S1 to be logically ANDed with each Star Map S2 to generate join Star Maps SJ', respectively, and the program executes (b) through (e) for all tables T2' and associated Star Maps S2'.

10. The computer program of claim 8 wherein the program includes executable instructions for determining the cardinality of the join result, and if the cardinality is less than a predefined threshold value, performing a) through e).

11. The computer program of claim 10, wherein the threshold value is determined dynamically depending on at least one parameter.

12. The method of claim 8, wherein T1 is the right table in a right outer join operation.

13. The method of claim 8, wherein T1 is the left table in a left outer join operation.

14. The method of claim 8, wherein the one or more Boolean operations is a logical AND operation.

15. A database system for accessing a database according to a outer join query, the query including join conditions, the database system including a massively parallel processing system including one or more nodes;
   a plurality of CPUs, each of the one or more nodes providing access to one or more CPUs;
   a plurality of virtual processes each of the one or more CPUs providing access to one or more processes;
   each process configured to manage data stored in one of a plurality of data-storage facilities;
   at least a first table T1 and a second table T2 being distributed among the data-storage facilities;
   each of the tables having an associated Star Map, S1 and S2, respectively, each Star Map being distributed among the data-storage facilities;
   each Star Map including bitmap entries having locations indexed by the hash of one or more values associated with one or more join key columns of its associated table, where a bitmap entry in a Star Map, if set, indicates the presence of a row in its associated table that has entries in the one or more join key columns that together hash to the location of the bitmap entry;
   a join process executed on one or more of the plurality of CPUs that cause the CPUs to a) perform one or more Boolean operations using the bitmap entries of the Star Maps S1 and S2 to produce set bitmap entries in a Star Map SJ where there is a corresponding set bitmap entry in S1 and a corresponding set bitmap entry in S2;

b) select a row from table T1 and hash the combined entries in the one or more join key columns of the selected T1 row to identify a bitmap entry in SJ;

c) if the identified bitmap entry in SJ is not set, project the selected T1 row with a NULL corresponding to data from table T2; and d) if the identified bitmap entry in SJ is set, performing the following:

d1) if no row in T2 satisfies the join conditions and has entries in its one or more join key columns that together hash to the location of the identified set bitmap entry in SJ, project the selected T1 row and a NULL corresponding to data from table T2; and d2) otherwise, for each row from T2 that satisfies the join condition and has entries in its one or more join key columns that together hash to the location of the identified set bitmap entry in SJ, project the selected T1 row with data from the row from T2, e) repeat b)–d) for all rows in T1.

16. The database system of claim 15, wherein a plurality of tables T2' and a plurality of associated Star Maps S2' are provided, and the join process further causes the CPUs to logically AND the Star Map S1 with each Star Map S2' to generate join Star Maps SJ', respectively, and to execute (b) through (e) for all tables T2' and associated Star Maps S2'.

17. The database system of claim 15 wherein the join process further causes the CPUs to determine the cardinality of the join result, and if the cardinality is less than a predefined threshold value, performing a) through e).

18. The database system of claim 17, wherein the join process further causes the CPUs to determine the threshold value dynamically depending on at least one parameter.

19. The database system of claim 15, wherein T1 is the right table in a right outer join operation.

20. The database system of claim 15, wherein T1 is the left table in a left outer join operation.

21. The database system of claim 15, wherein the one or more Boolean operations is a logical AND operation.

* * * * *

UNITED STATES PATENT AND TRADEMARK OFFICE
CERTIFICATE OF CORRECTION

PATENT NO. : 6,957,222 B1  Page 1 of 1
DATED : October 18, 2005
INVENTOR(S) : Ramesh, B.

It is certified that error appears in the above-identified patent and that said Letters Patent is hereby corrected as shown below:

<u>Column 12,</u>
Line 11, after "respectively" delete "anj" and insert -- and --.
Line 48, after "tables" delete "12" and insert -- T2 --.

Signed and Sealed this

Thirteenth Day of June, 2006

JON W. DUDAS
*Director of the United States Patent and Trademark Office*